United States Patent
Miller

(10) Patent No.: US 7,770,777 B2
(45) Date of Patent: Aug. 10, 2010

(54) PORTABLE FRICTION FORGE WELDER

(75) Inventor: Michael L. Miller, Bacliff, TX (US)

(73) Assignee: Forge Tech, L.L.C., Austin, TX (US)

(*) Notice: Subject to any disclaimer, the term of this patent is extended or adjusted under 35 U.S.C. 154(b) by 182 days.

(21) Appl. No.: 11/619,707

(22) Filed: Jan. 4, 2007

(65) Prior Publication Data
US 2007/0164081 A1    Jul. 19, 2007

Related U.S. Application Data

(63) Continuation-in-part of application No. 10/854,235, filed on May 27, 2004, now abandoned.

(51) Int. Cl.
*B23K 20/12* (2006.01)
(52) U.S. Cl. .............. 228/112.1; 228/2.3; 228/2.1; 228/114.5; 156/73.5
(58) Field of Classification Search ........... 228/112.1, 228/2.1, 2.3, 44.3, 48, 44.7, 219, 220, 114.5; 156/73.5
See application file for complete search history.

(56) References Cited

U.S. PATENT DOCUMENTS

| | | | |
|---|---|---|---|
| 3,599,857 A | | 8/1971 | Loyd et al. |
| 3,616,980 A | * | 11/1971 | Padilla ................. 228/2.3 |
| 3,704,821 A | * | 12/1972 | Loyd et al. ............ 228/2.3 |
| 3,775,834 A | | 12/1973 | Ishikawa et al. |
| 3,840,979 A | | 10/1974 | Miller et al. |
| 4,122,990 A | * | 10/1978 | Tasaki et al. ........... 228/2.3 |
| 4,593,848 A | | 6/1986 | Hochbein |
| 4,735,353 A | * | 4/1988 | Thomson et al. ...... 228/114.5 |
| 4,811,887 A | | 3/1989 | King et al. |
| 5,148,957 A | | 9/1992 | Searle |
| 5,261,592 A | | 11/1993 | Felix et al. |
| 5,558,265 A | * | 9/1996 | Fix, Jr. ................ 228/2.3 |
| 5,699,952 A | * | 12/1997 | Fix, Jr. ................ 228/102 |
| 5,735,447 A | * | 4/1998 | Fix, Jr. ................ 228/114.5 |
| 5,772,103 A | * | 6/1998 | Hofius et al. ......... 228/114.5 |
| 5,785,805 A | | 7/1998 | Fix, Jr. |

(Continued)

FOREIGN PATENT DOCUMENTS

JP    58-20388    2/1983

(Continued)

*Primary Examiner*—Roy King
*Assistant Examiner*—Michael Aboagye
(74) *Attorney, Agent, or Firm*—Taylor Russell & Russell, P.C.

(57) ABSTRACT

A portable friction forge welder that applies a direct rotational load to workpieces via a rotational actuator and a direct axial load to workpieces via an axial actuator, where the rotational actuator and the axial actuator have separate and independent power sources. The portable friction forge welder relies on a stored energy linear axial actuator or a center-hole hydraulic axial actuator to achieve high axial forces and a high torque, low rotational velocity to achieve rotational forces, enabling the welder to achieve higher quality welds using larger diameter workpieces than conventional portable friction welders. By applying a high axial force between workpieces prior to high torque rotation of the workpieces results in improved quality welds. A unique clamping device maintains a fixed positional relationship between the workpieces and includes a unique shroud that enables friction welds under a positive pressure inert atmosphere.

12 Claims, 11 Drawing Sheets

U.S. PATENT DOCUMENTS

| | | |
|---|---|---|
| 6,021,938 A | 2/2000 | Bock et al. |
| 6,095,395 A | 8/2000 | Fix, Jr. |
| 6,554,175 B1 | 4/2003 | Thompson |
| 6,634,540 B1 | 10/2003 | Afschrift et al. |
| 6,691,910 B2 | 2/2004 | Hirose et al. |
| 6,703,093 B2 | 3/2004 | Foster |
| 2001/0015369 A1 | 8/2001 | Litwinski et al. |

FOREIGN PATENT DOCUMENTS

| | | |
|---|---|---|
| JP | 58-38686 | 3/1983 |
| WO | WO 97/48518 | 12/1997 |

\* cited by examiner

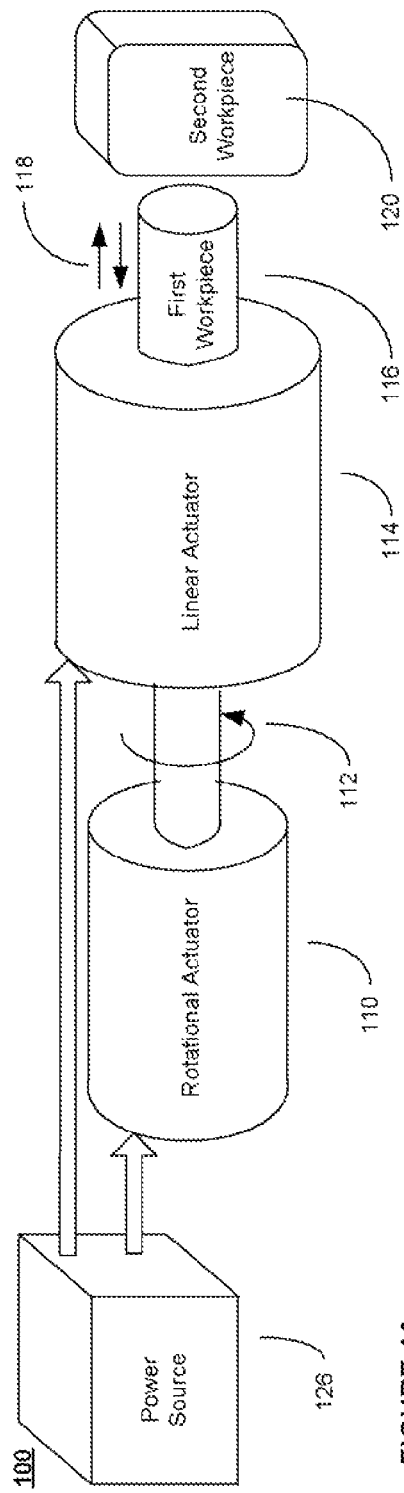
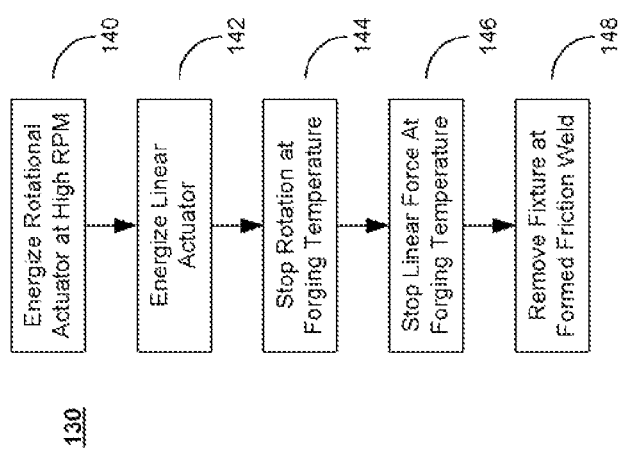
FIGURE 1A
PRIOR ART
FIGURE 1B
PRIOR ART

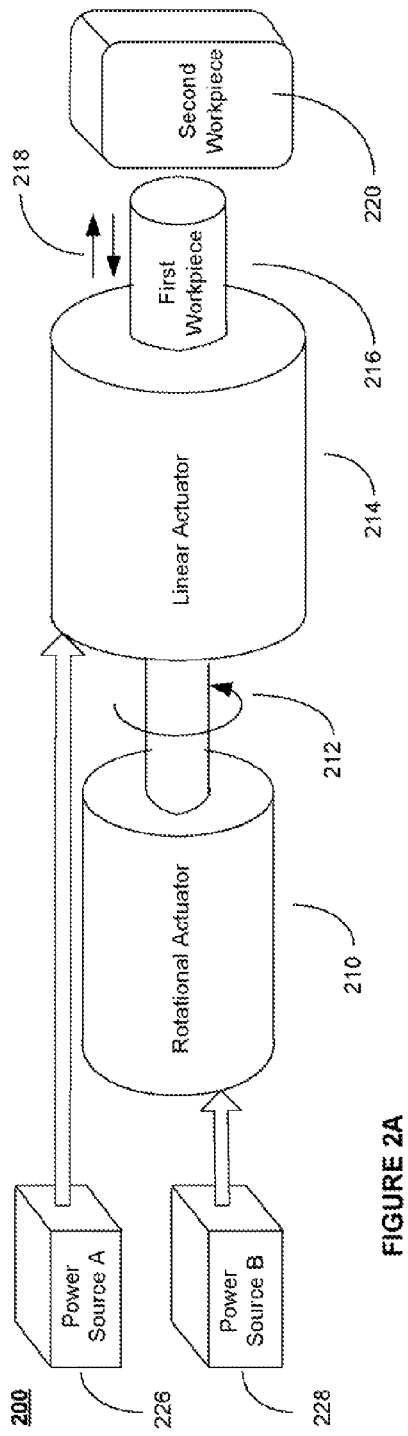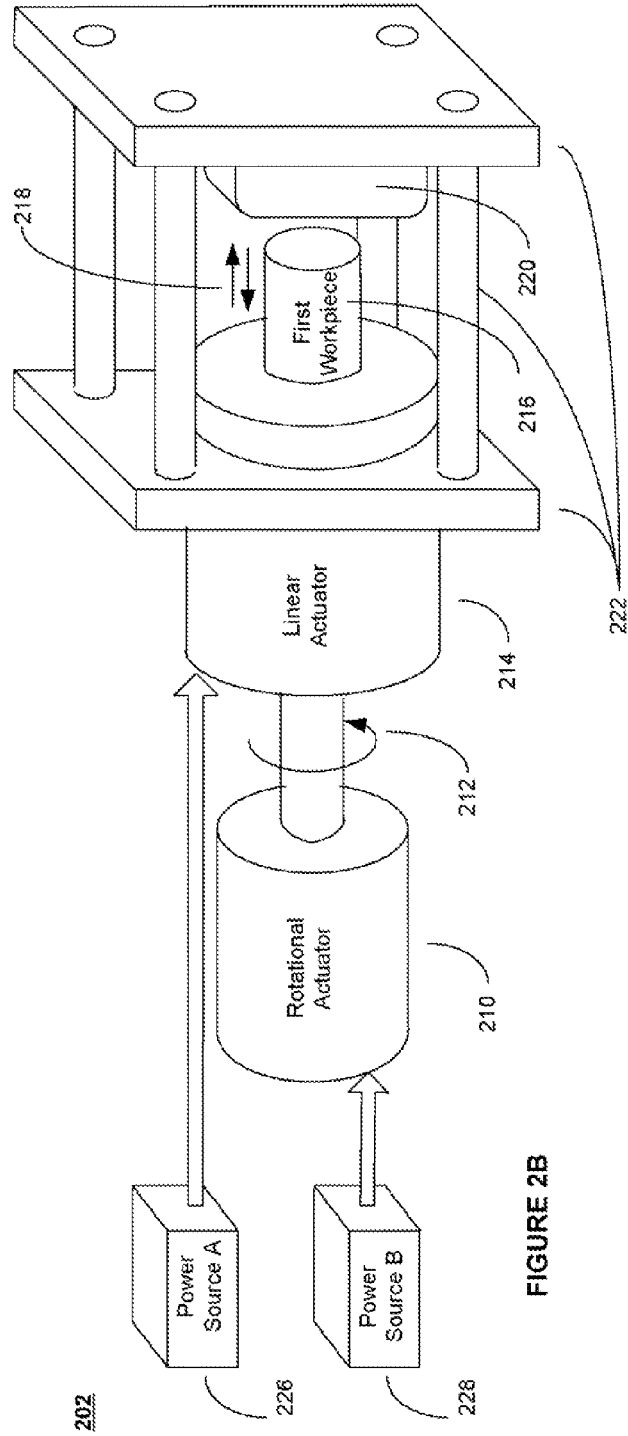

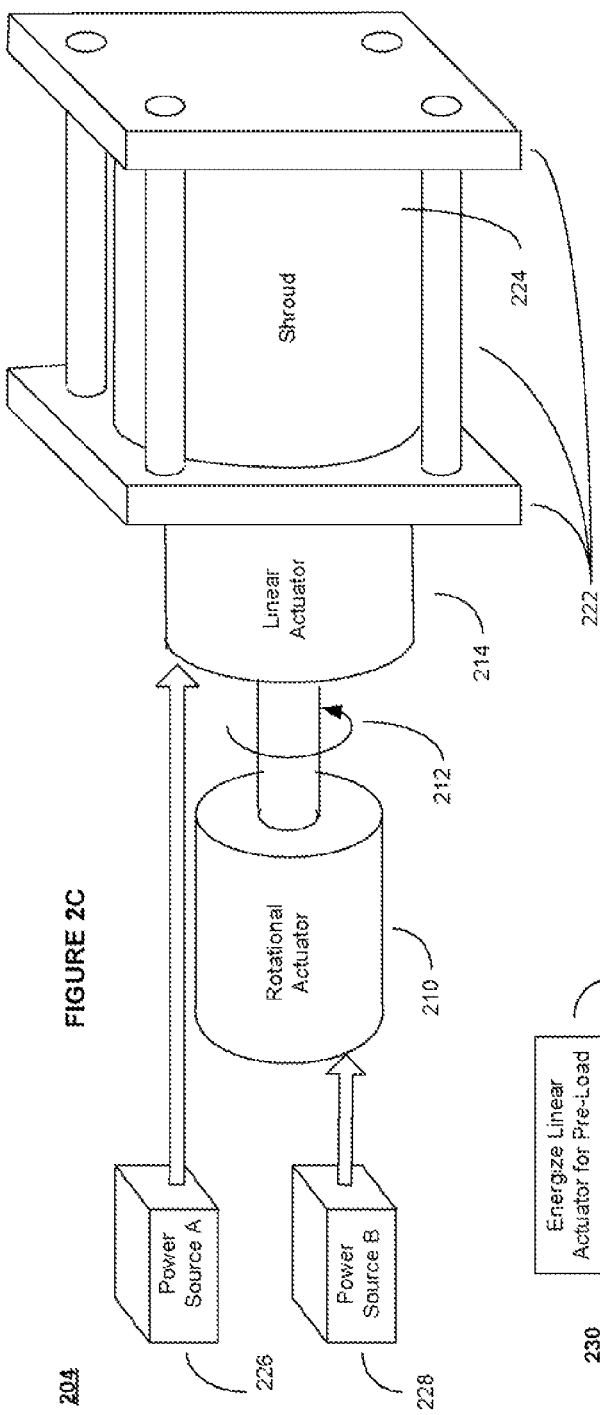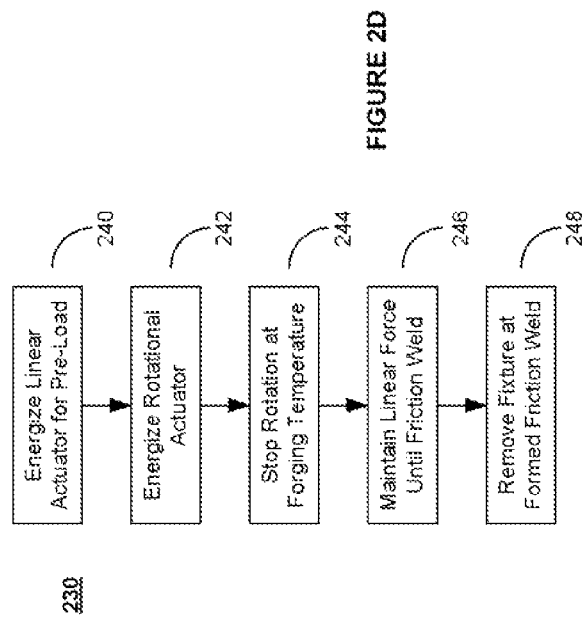

PORTABLE FRICTION FORGE WELDER

This application is a continuation-in-part of U.S. patent application Ser. No. 10/854,235 filed on May 27, 2004, (now Abandoned). U.S. patent application Ser. No. 10/854,235 is incorporated herein by reference.

BACKGROUND

The present invention generally relates to friction welding and, more particularly, to a portable friction forge welder for welding first and second workpieces together that applies direct axial load to the workpieces via a rotating stored energy linear axial actuator placed between the workpieces and a rotational device.

Friction welding is a process that welds metal or thermoplastics in which two members are joined by rubbing the mated parts under pressure. Heat is generated by direct conversion of mechanical energy to thermal energy at the interface of the mated parts, without the application of electrical energy or heat from other sources. The weld is made by holding a non-rotating part in contact with a rotating one under constant or gradually decreasing pressure, until the interface reaches a certain temperature, for example, forging temperature for metal parts. Rotation is then automatically stopped for a short period of time to consolidate the weld. Weld time varies depending on the materials being joined and the diameter of the workpiece to be joined.

Many industries have need for an effective portable friction forge welder for in situ or job site use. For example, within the petrochemical industry there are many systems directing the flow of fluids or gases through pipelines and valves which control the flow of those fluids and gases that often need to be replaced, repaired, or repacked in situ in the field. Due to the potentially flammable or explosive nature of such environments, traditional fusion welding methods are not utilized while the system is in a "live" on line status. Typically, in the field a drill and tap technique is used to join workpieces to repair such pipelines and valves. A drill initially bores a hole into a second workpiece and the bored hole is tapped or threaded. A threaded first workpiece, for example, a fitting is then able to be joined to the second workpiece. However, because of the inherent weakness of threaded connections and the potential leaks inherent in a non-sealed threaded connection, this practice is often considered to be an "emergency fix" to accommodate a temporary online repair of installation that will be replaced with a more permanent repair or replacement during scheduled shutdown repair or maintenance periods. Implementation of a repair during online conditions utilizing a friction forge welded component eliminates this risk of leakage and provides an acceptable permanent solution.

It is well established that portable friction forge welding is well suited for use in flame and spark restricted environments, such as those common to underground mines, petrochemical plants, refineries and off-shore oil drilling platforms. In such restricted or potentially explosive environments the preferred power source for tools is "non-electric" and is generally air-based (pneumatic). For reasons of safety in potentially explosive environments, conventional portable friction welders typically rely on available industrial pneumatic power sources of approximately 90-120 psi @ 65-90 CFM. Limited by this source to provide power to portable friction welders, conventional portable friction welders normally share this common pressurized air supply for producing rotational torque and axial force. This is, existing pneumatically powered portable friction welders, designed for in situ stud welding of workpieces (for example, attaching threaded studs or bosses to a second work piece) and similar applications utilize an integrated mechanism to apply both the necessary rotational force using a motor to apply torque & rpm and the necessary axial force using a linear actuator to apply axial forging force concurrently from a typically available industrial air supply.

This single shared motor power source limits the combined power capability of the welder. As a result, relatively high rpm and low torque pneumatic motors have been used because they minimize use of the compressed air supply and allow the remaining available energy of the air supply to be used to apply and maintain the necessary axial forging force required for friction welding. In a typical operational sequence of a conventional portable friction welder, the high RPM, low torque motor is allowed to reach a maximum rotational speed prior to applying an axial force, and the motor is typically forced to a much lower rotational speed or stalled condition as the axial force is applied.

Because of the limitations of the shared motor, these integrated "shared pneumatic power" designs limit the maximum workpiece or stud diameter that can be effectively welded to below ¾ in diameter. Additionally, the use of high rpm motors may generate higher than necessary temperatures that may also lead to undesirable weld characteristics. Fluctuations in the air supply may result in less than desirable forging force being applied. Furthermore, existing portable friction welder designs require a relatively complex control sequence so that when full rotational speed (rpm) is started and achieve, an integrated linear actuates is charged, either all at once or through sensing components, and the actuator applies and maintains the forging force following cessation of rotation until bonding is achieved.

A portable friction forge welder applying direct axial load to the workpieces via a rotating variable pressure means placed between the workpieces and a rotational device would be an improvement over the current arc welders, current portable friction welders and stationary friction welders because such a portable friction forge welder would enable a user to carry the portable friction forge welder on site and operate on live systems, and the rotational device would be totally independent of the pressurizing device. Such a portable friction forge welder should be able to effectively weld fittings in excess of one inch diameter, which is a substantial gain over the current art, and should also allow welded work to be contained and purged.

Therefore, a need exists for a portable friction forge welder which welds workpieces together with sufficient force to provide sufficient weld strengths, eliminates potential fluid or gas leaks resulting from online repairs and installation, prevents the surface temperature of the workpiece portion in contact with flammable materials from reaching undesirable temperatures, and provides a simple and effective means to accomplish these goals using a variety of workpiece materials, shapes, configurations and size.

SUMMARY

The present invention is a portable friction forge welder for friction welding workpieces together by applying an axial load by a linear actuator means to the workpieces and a rotational actuator means. The portable friction forge welder includes an interchangeable adapter configured to receive a fitting for a first workpiece, a linear actuator means with a front end and a rear end, and a rotational actuator means positioned behind the rear end of the linear actuator means. The friction forge welder is configured to be driven by the rotational actuator means, to be interconnected to a fixed positioning means for holding a second workpiece, and to effect a friction weld to first and second workpieces. The portable friction forge welder may also include a shroud means positioned on the fixed positioning means. The shroud means includes a purge stem and the fixed positioning means includes a seat to stabilize the friction forge welder.

The invention improves upon the current art by separating the rotational actuator means and the axial linear actuator means within a non-integrated design that uses the full available air source to power only a high torque, low rpm rotational means. The present invention relies on the novel use of a stored energy actuator to meet the high axial force requirements for friction welding, enabling the pressurized air supply to operate a low RPM, high torque pneumatic motor.

The invention may use a separate discrete "stored energy" linear actuator or a hydraulic cylinder to apply a predetermined, controlled axial forging force prior to rotation which is a direct axial force that is adequately maintained throughout the welding process. Since this separate force is not affected or limited by the available line air pressure, the resulting combined rotational and axial forces are significantly increased. The result is that the low RPM, high torque motor continues to provide rotationally generated friction required throughout the operational sequence of the friction forge welder, while the axial force is held sufficiently constant at a very high value by the stored energy actuator. This high axial force available from the present invention is significantly greater than can be provided by conventional portable friction welders that use a shared pressurized air supply between the devices for producing rotational and axial forces. A greater axial force available from the present invention enables larger workpieces to be friction welded than with conventional portable friction welders that provide a significantly lower axial force component. By providing greater control over the rotational and axial force means, the present invention provides improved weld characteristics as well as the capability to weld larger workpieces, compared with conventional portable friction welders.

In contrast with existing apparatus, the invention uses a limited travel linear actuator that is attached to the receiving work piece and preloads and maintains a direct linear axial force to a predetermined or preset forging pressure prior to the start of the rotation sequence. Since the linear actuator forces is preset, all that is required is a simple timed start/stop control sequence for rotation by the separate rotational actuator. The stored energy within the axial linear actuator maintains the forging force throughout the process to provide the necessary forged bond. Since the invention preloads the actuator and axial force, independent of the attachable rotational device, the actuator, stud and fixed positioning assembly can be accurately located and secured to the work piece, assuring a maximum and consistent axial force.

Since the invention preloads the actuator and axial force independent of the attachable rotational device the actuator, workpiece (e.g., stud) and clamping assembly can be accurately located and secured to the work piece. The residual yield of the assembly and clamping mechanism can be eliminated prior to beginning the rotation and forging process, thereby assuring maximum and consistent axial force.

In order to determine the adequacy of the forgeable time at which to friction forge weld a first workpiece against a second workpiece, there exists interdependence between the (1) force or pressure applied between the workpieces by a linear actuator, the (2) angular velocity at which a first workpiece is caused to rotate against a second workpiece by a rotational actuator, the (3) torque capable of being produced by the rotational actuator, and the (4) the diameter and material characteristics of the workpieces. Charts and graphs depicting these interrelated parameters are used for determining the appropriate values of forgeable times to be used in a particular situation. The data for these charts and graphs for determining forgeable times are determined experimentally a priori for various workpiece sizes and materials.

Although it has been demonstrated that friction welding can be safety accomplished in an explosion prone, flammable gaseous environment, for greater safety the invention incorporates within its design a unique mechanical shroud about the work piece that is designed to encapsulate the forge welding process. This mechanical shroud provides a sealed surface and complete containment between the forge welder and substrate, thereby insuring that the welding takes place in a positively pressured inert atmosphere (such as in a nitrogen atmosphere) within the shroud. These friction forge welds conducted within an oxygen and hydrogen deficient atmosphere are associated with improved metallurgical characteristics, including less embrittlement about the heat affected zone (HAZ) and increased tensile strength.

An embodiment of the current invention is a method for welding a first workpiece to a second workpiece using a portable friction forge welder, comprising the steps of forcibly positioning the first workpiece against the second workpiece by applying a predetermined axial force to the first workpiece by a linear actuator, rotating the first workpiece at a predetermined angular velocity for a forgeable time period to ensure a satisfactory friction forge weld at an interface between the first workpiece and the second workpiece, the forgeable time period beginning as the predetermined axial force is applied, and stopping the rotating at the end of the forgeable time period and maintaining the predetermined axial force until the interface between the first workpiece and the second workpiece has cooled to form a friction weld. The method further comprises the step of positionally fixing the first workpiece into close proximity to the second workpiece by a clamping means. The method further comprises the steps of encapsulating and sealing the interface between the first workpiece and the second workpiece from the ambient atmosphere by a shroud positioned on the clamping means. The method further comprises the step of positively pressurizing the shroud with an inert atmosphere. The method further comprises the step of providing separate and independent power sources for the linear actuator and the rotational actuator. The method wherein the linear actuator is a stored energy actuator. The method wherein the linear actuator is selected from the group consisting of a hydraulic cylinder, a hydraulic cylinder and energy storage accumulator, a compressed gas cylinder, compressed springs, spring washers and Bellville washers. The method further comprises the step of preloading the linear actuator prior to rotating for accurately locating and securing the workpieces to the clamping means to compensate for residual flexing of the clamping means while under load. The method wherein the step of rotating further comprises rotating at a predetermined constant rotational velocity for a predetermined period of time. The method wherein the rotational actuator is selected from the group consisting of an electric motor, a pneumatic motor, a hydraulic motor, and a combustion engine. The method wherein the linear actuator is a high force actuator and the rotational actuator is a low rotational velocity and high torque actuators. The method wherein the forgeable time period is determined a priori based on a force applied between the first and second workpieces by the linear actuator, an angular velocity and torque produced by the rotational actuator for rotating the first workpiece against the second workpiece, and a diameter and material characteristics of the workpieces. The method wherein the forgeable time period is set into a timing device for starting and stopping a power source provided to the rotational actuator.

Another embodiment of the current invention is a system for welding a first workpiece to a second workpiece using a portable friction forge welder, comprising a linear actuator for forcibly positioning the first workpiece against the second workpiece by applying a predetermined axial force to the first workpiece, a rotational actuator for rotating the first workpiece at a predetermined angular velocity for a forgeable time period to ensure a satisfactory friction forge weld at an interface between the first workpiece and the second workpiece, the forgeable time period beginning as the predetermined axial force is applied, and means for stopping the rotating at the end of the forgeable time period and maintaining the predetermined axial force until the interface between the first workpiece and the second workpiece has cooled to form a friction forge weld. The system further comprises a clamping means for positionally fixing the first workpiece into close proximity to the second workpiece. The system further comprises a shroud positioned on the clamping means for encapsulating and sealing the interface between the first workpiece and the second workpiece from the ambient atmosphere. The system of further comprises means for positively pressurizing the shroud with an inert atmosphere. The system further comprises separate and independent power sources for the linear actuator and the rotational actuator. The system wherein the linear actuator is a stored energy actuator. The system wherein the linear actuator is selected from the group consisting of a hydraulic cylinder, a hydraulic cylinder and energy storage accumulator, a compressed gas cylinder, compressed springs, spring washers and Bellville washers. The system further comprises means for preloading the linear actuator prior to rotating for accurately locating and securing the workpieces to the clamping means to compensate for residual flexing of the clamping means while under load. The system wherein the rotational actuator rotates at a predetermined constant rotational velocity for a predetermined period of time. The system wherein the rotational actuator is selected from the group consisting of an electric motor, a pneumatic motor, a hydraulic motor, and a combustion engine. The system wherein the linear actuator is a high force actuator and the rotational actuator is a low rotational velocity and high torque actuator. The system wherein the forgeable time period is determined a priori based on a force applied between the first and second workpieces by the linear actuator, an angular velocity and torque produced by the rotational actuator for rotating the first workpiece against the second workpiece, and a diameter and material characteristics of the workpieces. The system wherein the forgeable time period is set into a timing device for starting and stopping a power source provided to the rotational actuator.

Yet another embodiment of the current invention is a method for portable friction forge welding a first workpiece to a second workpiece, comprising the steps of positionally fixing the first workpiece into close proximity to the second workpiece by a clamping means, preloading the clamping means by forcibly positioning the first workpiece against the second workpiece by applying a predetermined constant axial force to the first workpiece by a linear actuator, eliminating affects of mechanical flexing of the clamping means by positionally fixing an accurate positional relationship between the first workpiece and the second workpiece while the predetermined constant axial force is applied to the first workpiece, rotating the first workpiece by a rotational actuator at a predetermined angular velocity for a forgeable time period to ensure a satisfactory friction forge weld at an interface between the first workpiece and the second workpiece, the forgeable time period beginning as the predetermined axial force is applied, stopping the rotating at the end of the forgeable time period, and maintaining the predetermined axial force until the interface between the first workpiece and the second workpiece has cooled to form a friction forge weld. The method wherein the forgeable time period is determined a priori based on a force applied between the first and second workpieces by the linear actuator, an angular velocity and torque produced by the rotational actuator for rotating the first workpiece against the second workpiece, and a diameter and material characteristics of the workpieces. The method wherein the forgeable fine period is set into a timing device for starting and stopping a power source provided to the rotational actuator.

The invention disclosed herein is, of course, susceptible of embodiment in many different forms. Shown in the drawings and described herein below in detail are preferred embodiments of the invention. It is to be understood, however, that the present disclosure is an exemplification of the principles of the invention and does not limit the invention to the illustrated embodiments.

BRIEF DESCRIPTION OF THE DRAWINGS

These and other features, aspects and advantages of the present invention will become better understood with regard to the following description and accompanying drawings wherein:

FIGS. 1A and 1B depict a functional diagram and sequence of operation of a portable friction large welder according to the prior art;

FIGS. 2A, 2B, 2C and 2D depict functional diagrams of a portable friction forge welder according to the current invention;

DETAILED DESCRIPTION

Figure 3:
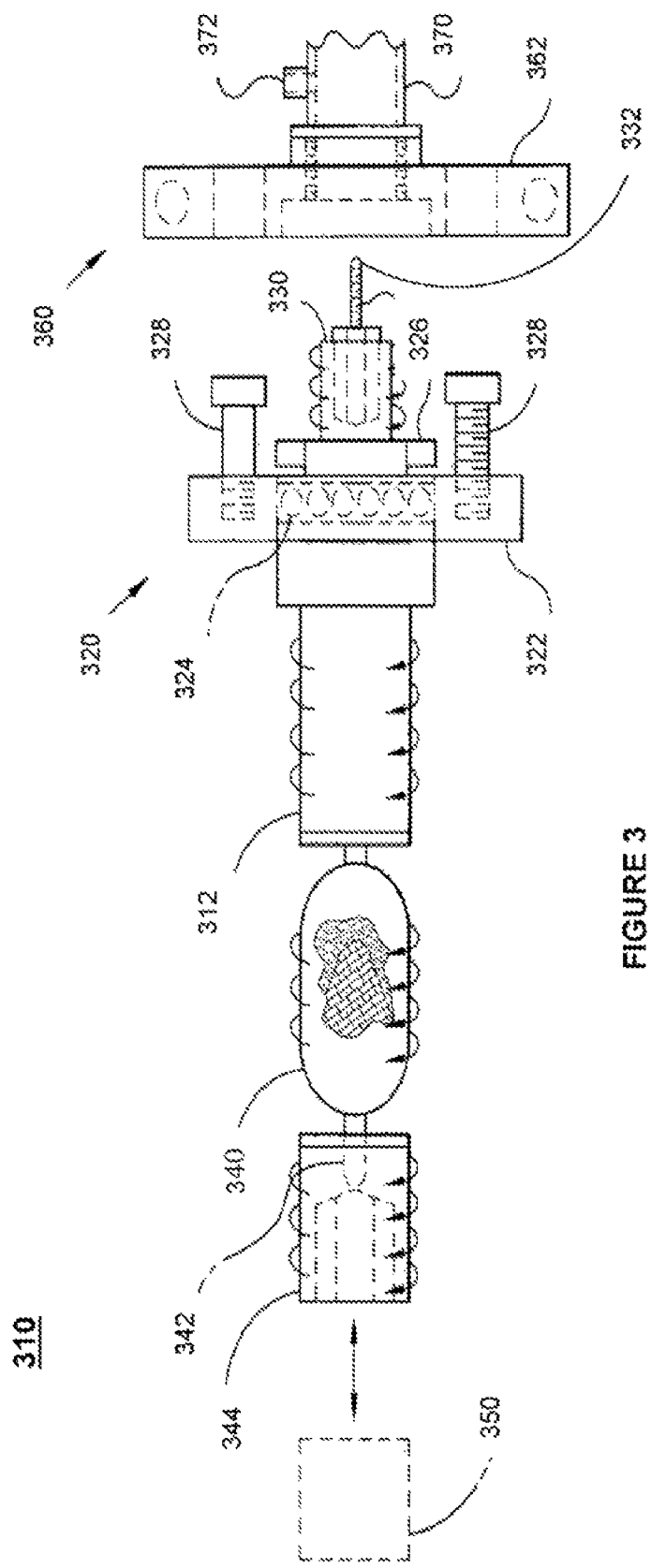
FIG. 3 depicts an embodiment of the current invention including a stored energy accumulator and a piston driven hydraulic linear actuator.

Turning to FIG. 1, FIG. 1 depicts a functional diagram of a portable friction welder 100 according to the prior art. Similar to the current invention, existing conventional portable friction welders require a clamping means to enable an axial force 118 to be applied by a first rotatable workpiece 116 to a second positionally fixed workpiece 120 by an axial force means 114. A rotational force means 110 is required to rotate 112 the first workpiece 116 as it is rotated and axially forced 118 against the second workpiece 120 to form a friction weld between the first workpiece 118 and the second workpiece 120. For a source of power to energized the rotational force means 110 and the axial force means 114, pressurized air is normally available in most industrial plants as a power source 126 for operation of instruments, valve actuators, etc. For reasons of safety in potentially explosive environments, conventional portable friction welders typically rely on available industrial pneumatic power sources 126 of approximately 90-120 PSI @ 65-90 CFM. Limited by this source to provide power to portable friction welders, conventional portable friction welders normally share this common pressurized air power supply 126 for producing rotational torque 112 and axial force 118. Use of high RPM, low torque pneumatic motors minimizes the use of the available air supply, leaving more of the available air supply for use by pneumatic cylinders for providing a sufficient linear axial force required for friction welding. In a typical operational sequence of a conventional portable friction welder, the high RPM, low torque rotational actuator 140 is allowed to reach a maximum rotational speed prior to applying an axial force by the linear axial actuator 142, and the motor is typically forced to a much lower rotational speed or stalled condition as the axial force is applied 144. As a desired forging temperature is reached, the linear axial force is stopped 146 and the portable friction welding fixture is removed when a friction weld is formed 148.

Turning to FIGS. 2A, 2B, 2C and 2D, FIGS. 2A, 2B, 2C and 2D depict functional diagrams 200, 202, 204, 230 of a portable friction forge welder according to the current invention. FIG. 2A depicts a linear actuator 214 receiving power from an independent power source A 226 in order to provide an axial force 218 to a first workpiece 216 against a second workpiece 220. A rotational actuator 210 receives power from another indepedent power source B 228 in order to provide a rotational force 212 to the first workpiece 216 against the second workpiece 220. FIG. 2B depicts the elements shown in FIG. 2A with the addition of a clamping means 222 to positionally fix the first workpiece 216 in relation to the second workpiece 220. FIG. 2C depicts the elements shown in FIG. 2B with the addition of a shroud 224 for encapsulating the first workpiece 216 and the second workpiece 220 for isolation from ambient atmosphere. Fixtures may be provided on the shroud for purging the shroud and maintaining a positive pressure within the shroud with an inert atmosphere.

The present invention may rely on the novel use of a stored energy actuator 210 to meet the high axial force requirements 218 for friction welding, enabling a pressurized air supply 228 to operate a low RPM, high torque rotational actuator 210, such as a pneumatic motor. This configuration enables an operational sequence 230 shown in FIG. 2D that enables pre-loading the axial force by first applying the required high axial force 218 required for friction welding by energizing a linear actuator 240, and then rotating the first workpiece 218 by energizing a rotational actuator 242 until the desired weld characteristics are achieved, without undue limitations of the characteristics of the air supply 228. The result is that the low RPM, high torque motor 210 continues to provide a rotational force 212 for generating friction required throughout the operational sequence 230 of the friction forge welder, while the axial force 218 is held constant at a very high value by the stored energy actuator 214. This high axial force 218 available from the present invention is significantly greater than can be provided by conventional portable friction welders that use a shared pressurized air supply between the devices for producing rotational and axial forces, as shown in FIG. 1. A greater axial force 218 available from the present invention enables larger workpieces to be friction welded than with conventional portable friction welders that provide a significantly lower axial force component. By providing greater control over the rotational force means 210 and axial force means 214, the present invention provides improved weld characteristics as well as the capability to weld larger workpieces, compared with conventional portable friction welders. The rotational force 212 is stopped when a desired forging temperature is reached 244, and the linear force 218 is maintained until the desired friction weld is achieved 246. The portable friction forge welder fixture is then removed from the workpieces 248.

In the present invention, a conventional, off-the-shelf pneumatic motor may be used to provide the rotational force means 210. The axial force means 214 may be provided by a stored energy actuator that may rely on various methods for operation, such as actuators that use hydraulic, mechanical and compressible gas means. A unique shroud 224 may be applied to the clamping means of the present invention that enables inert gases to be held under a positive pressure about the weld, giving further improvement in weld characteristics.

Turning to FIG. 3, FIG. 3 depicts an embodiment of the current invention 310 including a stored energy accumulator and a piston driven linear actuator. FIG. 3 shows a portable friction forge welder 210 according to the present invention that applies direct axial load to the workpieces via a rotating variable pressure hydraulic cylinder 312 placed between the workpieces and a rotational device 350. The friction forge welder 310 includes a rotatable variable pressure hydraulic cylinder 312, a bearing housing 322, thrusts bearings 324, a thrust collar 326, guide pins 328, an interchangeable adapter 330, a fitting 332, an optional pressurizing device 340, and an interchangeable drive socket 344.

The friction forge welder 310 is configured to be driven by an interchangeable rotational device 350, and is configured to be interconnected to a clamp assembly 360 to affect the friction weld to workpieces. The configuration of the present portable friction forge welder invention is moved because there are no known friction welders that position a rotating variable pressure hydraulic cylinder 312 configured to apply a direct axial load to the workpieces between the workpieces and the rotational device 350, which increases versatility, reduces overall length, and optimizes the ability to provide unlimited direct axial load to workpieces on the basis of rotational velocity of the rotational device and time.

The variable pressure hydraulic cylinder 312 includes a cylinder with a predetermined diameter, a front end, and a rear end. The front end of the hydraulic cylinder 312 is attached to the rear surface of the hearing housing 322. Spring washers, such as Belleville washers, may be installed in the front end of the hydraulic cylinder 312 to maintain axial load across the bearing housing 322. The rear end of the hydraulic cylinder 312 includes a fluid port and is connected to the optional pressurizing device 340. The hydraulic cylinder 312 is configured to be pressurized by the pressurizing device 340 and to exert a direct axial load to the adapter 330 and fitting 332. The axial load capability of the hydraulic cylinder 312 may range from zero tons to about one hundred tons.

The bearing housing 322 includes front and rear surfaces. Thrust bearings 324 and a thrust collar 326 are centrally mounted in the bearing housing 322. The thrust collar 326 annularly extends from the front surface of the bearing housing 322. The thrust collar 326 is configured to interchangeably receive various types of adapters 330, and is configured to take direct axial thrust loads from the hydraulic cylinder 312. The rear surface of the bearing housing 322 is interconnected with the front end of the hydraulic cylinder 312. The bearing housing 322 is configured to be inserted into the clamp assembly utilizing the guide pins 328 and it is then locked into position.

The interchangeable adapter 330 includes a socket at one end that may be configured to engage a hex fitting, a square fitting, etc. The other end of the adapter is removably connected with the thrust collar 326 so that adapters configured for various fittings may be removably connected to the thrust collar 326. The adapter 330 is preferably formed of metal, such as iron or steel, and has no sharp edges on its exterior surface. The fitting 32 is a threaded fitting preferably configured for holding a one-quarter inch to about a two inch workpiece, but this dimensional range may vary as desired.

The optional pressuring device 340 has a front end and a rear end, and is illustrated as a gas charged bladder-type diaphragm accumulator. The accumulator 340 has a sealed housing with a valve, such as a schroeder valve or the like, to enable the accumulator to be pressurized to a desired pressure. Positioned within the housing is a sheet-like movable diaphragm composed of a flexible material, such as rubber, to subdivide the interior space into two fluid-tight pressure chambers on opposite sides of the diaphragm. One chamber is a fluid chamber into and out of which the working hydraulic fluid of the friction forge welder 310 is accumulated and expelled under pressure when required. The other chamber is charged with an inert gas, such as argon, nitrogen, xenon, krypton, etc., under high pressure to act as an energy storage medium. In use, the working fluid accumulates in the fluid chamber and when the fluid pressure exceeds the pressure of the trapped gas, the diaphragm is elastically displaced, further compressing the gas on the other side. The gas is later utilized to expel on demand the stored fluid under pressure out of the fluid chamber back into the hydraulic cylinder 312.

Other types of gas charged accumulators may also be used including piston-type and bellow-type accumulators. While the friction forge welder 310 is illustrated with one type of pressurizing device 340 configured to pressurize the hydraulic cylinder 312, it is to be understood that the hydraulic cylinder 312 may be pressurized in any one of a number of ways including hydraulically with a pump, through the use of an accumulator, and/or manually by turning or squeezing a nut, thereby precluding the need for a pressurizing device.

The interchangeable drive socket 344 is configured to interchangeably receive various types of rotational devices 350, such as air motors, electric motors, etc. The drive socket 344 may be configured as a hex socket, a square socket, etc.

Figure 4:
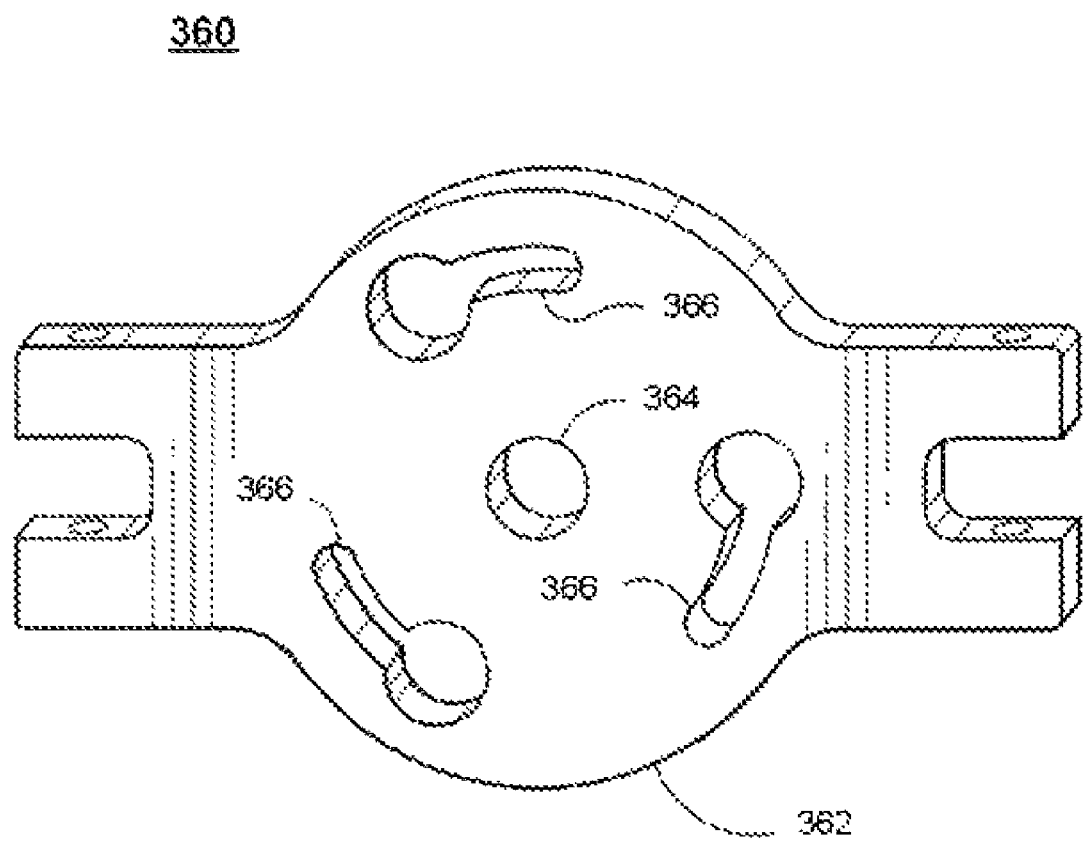
FIG. 4 is a perspective view of a clamp for use with a portable friction forge welder according to the present invention.

The clamping assembly 360, shown in FIG. 4, includes a clamp 362 and a shroud 370. The shroud 370 includes a purge stem 372. The clamp 362 may be adjustably configured for clamping to plates having a diameter ranging from about one to one hundred inches. The clamp 362 includes a seat 364 to stabilize the welder 310. The seat 364 terminates and transcends into the shroud 370. The shroud 370 functions as a purge chamber around a workpiece by directing inert gas to the region of the weld when forming the friction weld.

The portable friction forge welder 310 is configured to be carried by a human operator for friction welding two workpieces to each other. The operation of the portable friction forge welder 310 is effected by installing the clamp assembly 360 to a first workpiece, e.g. a pipe, a plate, a flange, etc. An appropriately configured adapter 330 is then attached to the thrust collar 326. An appropriately configured fitting 332 is then inserted into the adapter 330.

A second workpiece is attached to the fitting 332. The guide pins 328 of the bearing housing 322 are then inserted into the openings 366 in the clamp 360 and the bearing housing 322 is locked into position. The pressurizing device 340 is then pressurized to an appropriate axial load. The front end of the pressurizing device 340 is then interconnected to the rear end of the hydraulic cylinder 312. An appropriate drive socket 344 is then attached to the rear end of the pressurizing device 340.

An appropriate rotational device 350 is then inserted into the drive socket 344. The rotational device 350 may be inserted to the drive socket 344 at any angle from in-line (e.g., zero degrees) to ninety degrees. The rotational device 350 is then run for a predetermined amount of time. The portable friction forge welder 310 may be configured with automatic start and stop elements. The rotational device 350 is then removed from the drive socket 344 and a friction weld is affected between the first and second workpieces. Hydraulic pressure is maintained on the fitting 332 for a predetermined amount of time, such as one minute, after rotation ceases. The bearing housing 322 is then unlocked from the clamp assembly and the clamp assembly is then removed from the welded first and second workpieces.

The portable friction forge welder 310 produces welds with a joint strength equal to or stronger than the parent materials, at a lower cost per weld than conventional welding devices. The weld preparation is less costly than conventional welds and the weld joints are very reliable. In addition, dissimilar materials can be welded without filler material. The friction weld also provides self-cleaning/decontamination of the weld interface.

The portable friction forge welder 310 according to the invention that applies direct axial load to the workpieces via a rotating variable pressure hydraulic cylinder placed between the workpieces and a rotational device. The portable friction forge welder 310 applies a direct axial load to the workpieces between the workpieces and the rotational device 350, increases versatility, reduces overall length, and optimizes the ability to provide maximum engineered direct axial load to workpieces on the basis of rotational velocity of the rotational device and time. The portable friction forge welder 310 applies direct rotation to the portable variable pressure hydraulic cylinder 312 which provides the capability of friction welding various size fittings to a base metal or substrate utilizing various driving devices, thereby increasing versatility and capability over known friction welders.

Figure 5:
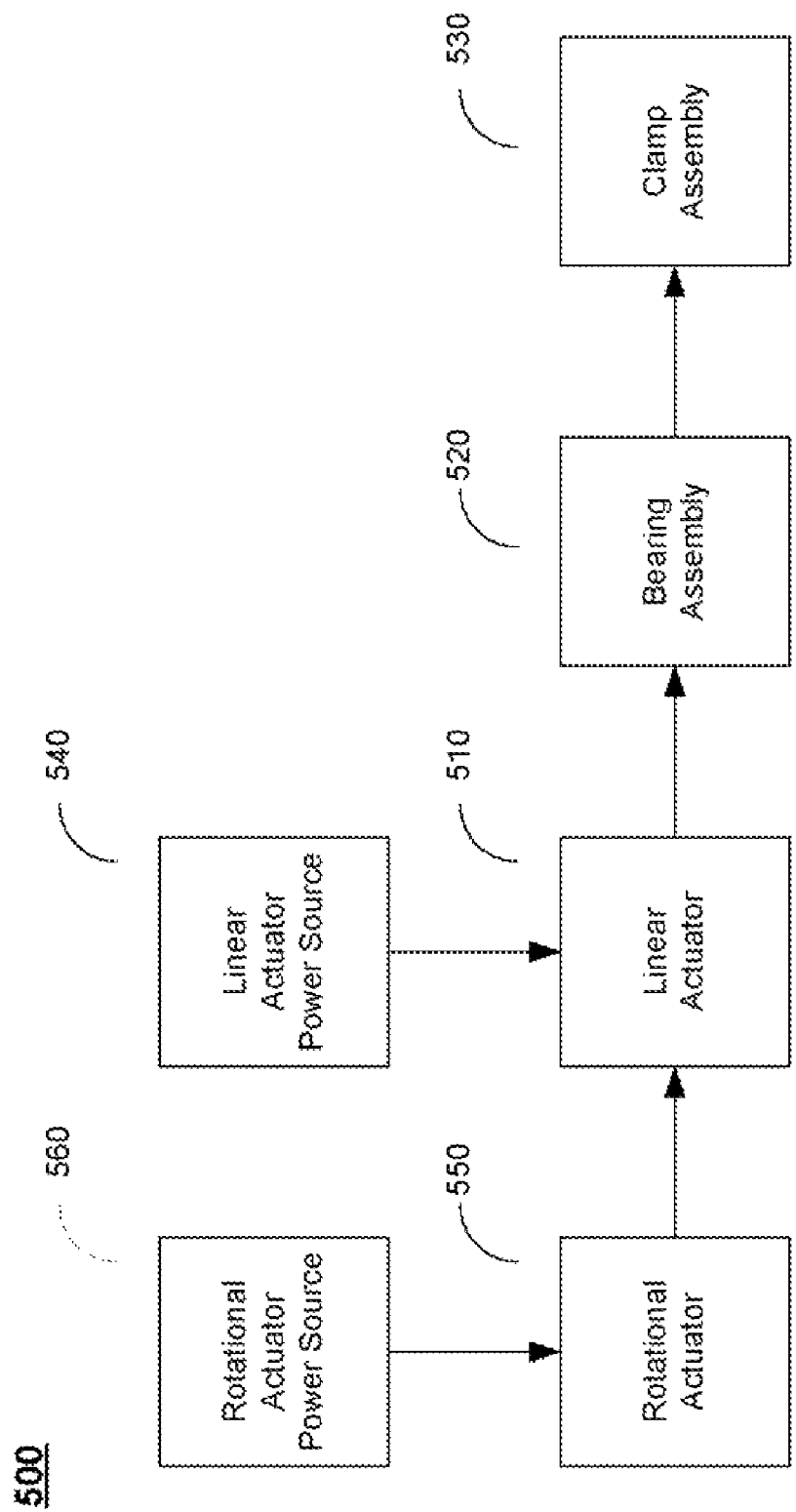
FIG. 5 depicts a functional representation of a portable friction forge welder having separate and independent power sources for the rotational and linear actuators.

Turning to FIG. 5, FIG. 5 depicts a functional representation of a portable friction forge welder having separate and independent power sources for the rotational and linear actuators. A rotational actuator power source 560 provides power to a rotational actuator 550, and a linear actuator power source 540 provides power to a linear actuator 510. A bearing assembly 520 is acquired to enable the high rotational and axial forces required while the workpieces are held by the clamp assembly 530.

Figure 6:
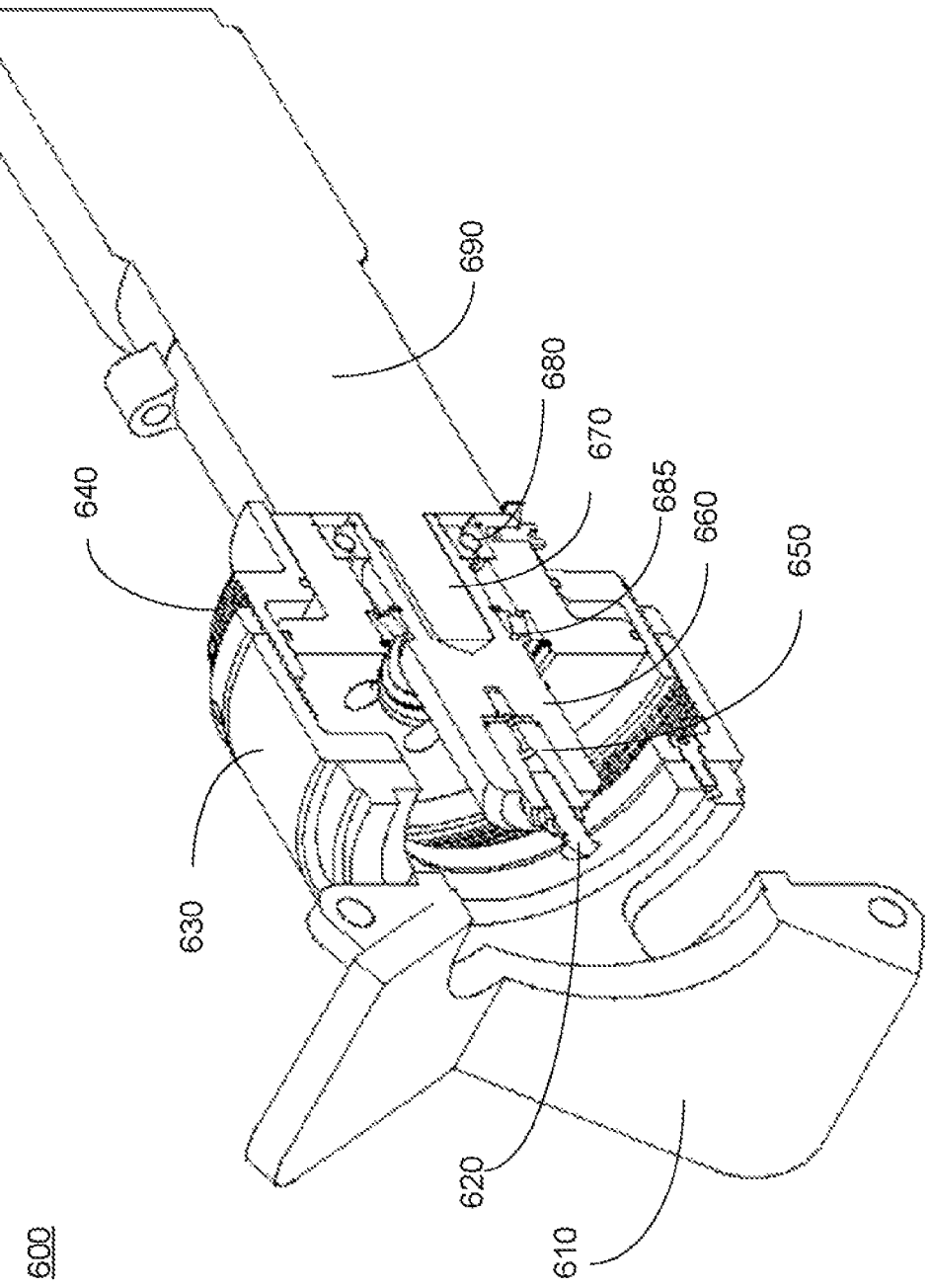
FIG. 6 shows an embodiment of a portable friction forge welder that uses preloaded compressed gas to power the linear actuator.

Turning to FIG. 6. FIG. 6 shows an embodiment of a portable friction forge welder 600 that uses preloaded compressed gas to store or pre-charge a linear actuator 660 for providing an axial force in a portable friction forge welding operation. The portable friction forge welder 600 comprises three main sections, including a clamping means 610, a linear actuator assembly 630 and a rotational actuator means 690. The linear actuator assembly 630 comprises a stored energy linear actuator 660 and first workpiece 620 positioned within the linear actuator assembly 630 and forced against a second workpiece by threaded means 640. The stored energy linear actuator 660 includes a work piece adaptor 650 for accepting a first workpiece 620, and a rotational adaptor 670 for accepting rotational force from the rotational actuator means 690. Bearings 680, 685 are included in order to maintain positional alignment of the stored energy linear actuator 660 as linear and rotational forces are applied to force the first workpiece 620 into a second workpiece (not shown) held in a clamp assembly 610. Unlike many fluids that are not compressible, a compressed gas may be used as an energy storage medium. A compression action between the first workpiece 620 and the second workpiece to achieve a desired linear force is accomplished through use of the clamping assembly 610. The linear and rotational forces are applied by the linear actuator 660 and the rotational actuator means 690 to the first workpiece 620 against a second workpiece for a pre-determined period of time, typically between 3 and 20 seconds, to achieve a satisfactory friction forge weld between the first and second workpieces. The rotational force provided by the rotational actuator means 690 is then stopped while the linear force provided by the stored energy linear actuator 660 is maintained for a cool-down period or stress relieving phase, typically between 30 and 60 seconds. The portable friction force welder 600 is then removed from the second workpiece.

Figure 7:
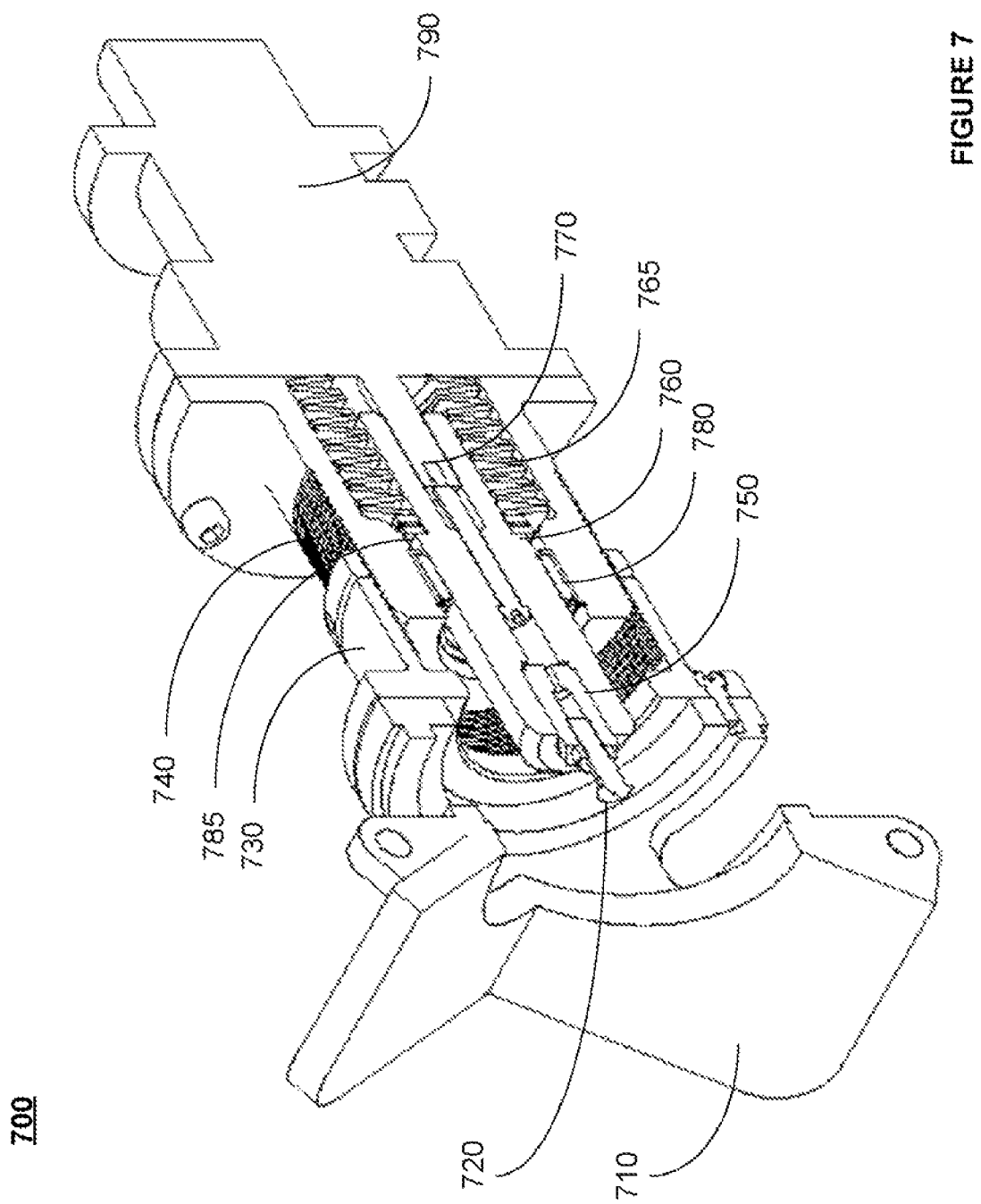
FIG. 7 shows an embodiment of a portable friction forge welder that uses preloaded springs to power a linear actuator.

Turning to FIG. 7, FIG. 7 shows an embodiment of a portable friction forge welder 700 that uses preloaded springs or Belleville washers 765 as energy storage components to provide stored energy to an axial force linear actuator 730. The embodiment of the portable friction force welder 700 comprises a clamping means 710, linear actuator assembly 730 and a rotational actuator means 790. The linear actuator assembly 730 comprises a stored energy linear actuator 760, 765 and first workpiece 720 positioned within the linear actuator assembly 730 and forced against a second workpiece by threaded means 740 and the clamping assembly 710. The stored energy linear actuator 760, 765 includes a work piece adaptor 750 for accepting a first workpiece 720, and a rotational adaptor 770 for accepting rotational force from the rotational actuator means 790. Bearings 780, 785 are included in order to maintain positional alignment of the stored energy linear actuator 760, 765 as linear and rotational forces are applied to force the first workpiece 720 into a second workpiece held in a clamp assembly 710. The axial force provided by the linear actuator assembly 730 may be pre-set or energized to a pre-determined force at an off site location and brought to a forge welding site for installation into a friction forge welder without additional energizing by an operator or installer. This enables the elimination of this step from the procedures required by an operator or installer, improving quality control of the forge welding process. Pre-loading the spring or Belleville washer energy storing component 765 within the linear actuator assembly 730 may be accomplished by a torque means on a nut, a hydraulic pulling means on the stored energy linear actuator 760, 765, or by the threads 740 provided on the linear actuator assembly 730. These methods provide for compression of the energy storing component 765 as it is compressed against radial bearings 780 and thrust bearings 785. By compressing the energy storing component 765 to a pre-determined point, a pre-determined amount of force or energy is generated and held constant by the linear actuator assembly. The linear actuator assembly 730 incorporates an internal thread design that accepts the pre-charged linear actuator 760, 765 that enables the first workpiece 720 to travel within the linear actuator assembly until contact is made with the first workpiece 720 and a second workpiece positionally fixed by the clamping assembly 710. The linear and rotational forces are applied by the linear actuator 760, 765 and the rotational actuator means 790 to the first workpiece 720 against a second workpiece for a pre-determined period of time, typically between 3 and 20 seconds, to achieve a satisfactory friction forge weld between the first and second workpieces. The rotational force provided by the rotational actuator means 790 is then stopped while the linear force provided by the stored energy linear actuator 760 is maintained for a cool-down period or stress relieving phase, typically between 30 and 60 seconds. The portable friction forge welder 700 is then removed from the second workpiece.

Figure 8:
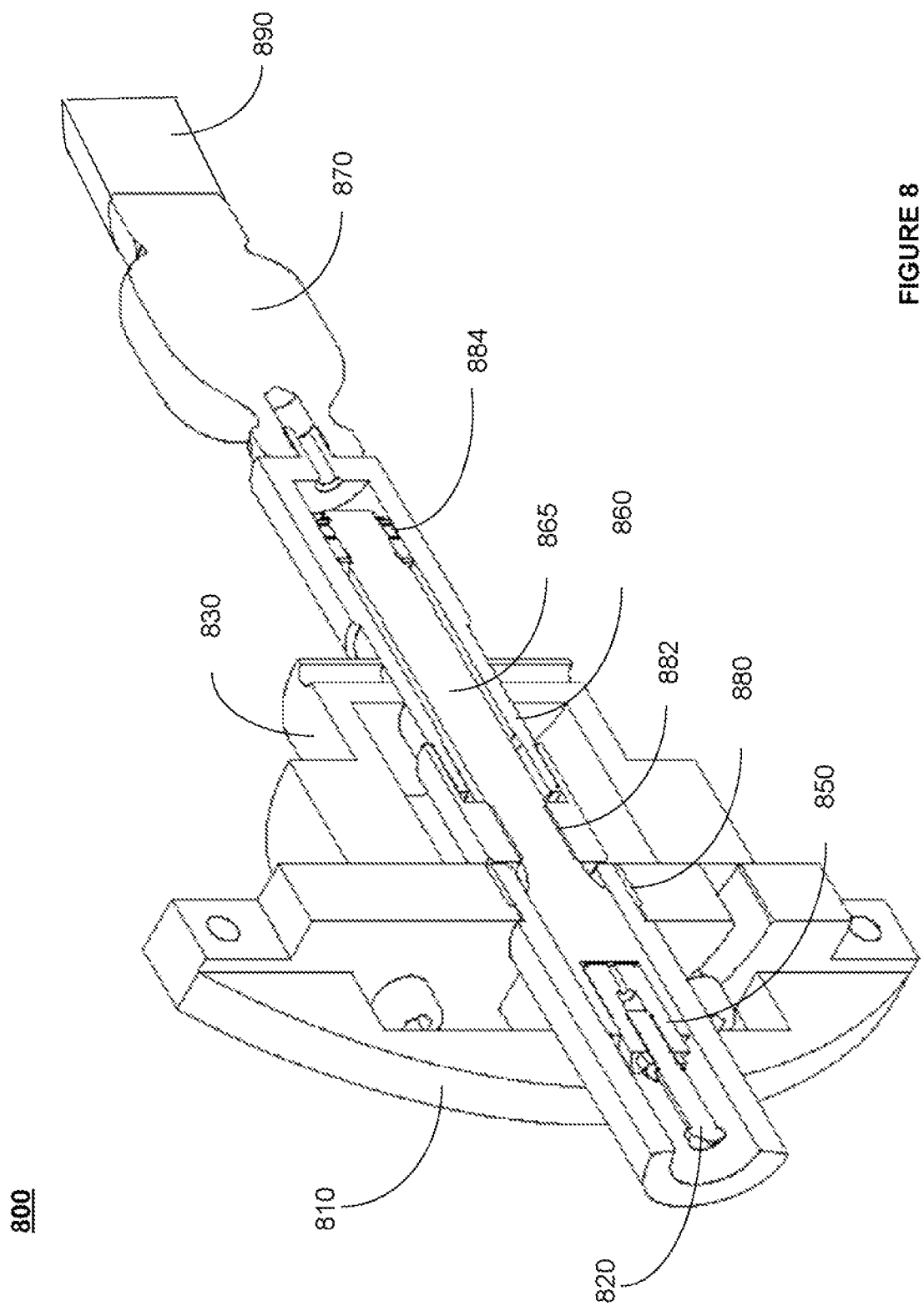
FIG. 8 shows an embodiment of a portable friction forge welder that uses an energy storing accumulator to power a hydraulic cylinder.

Turning to FIG. 8, FIG. 8 shows an embodiment of a portable friction forge welder 800 that uses a hydraulic energy storing accumulator 870 to power a hydraulic cylinder 860 to provide stored energy to an axial force linear actuator assembly 830. The embodiment of the portable friction forge welder 800 is a similar embodiment of that shown in FIG. 3, and comprises a clamping means 810, linear actuator assembly 830, an energy storing accumulator 870, and a rotational actuator means 890. The linear actuator assembly 830 comprises a hydraulic cylinder 860 containing a piston 865 actuated by the hydraulic energy storing accumulator 870, and first workpiece 820 positioned within the hydraulic cylinder 860 and forced against a second workpiece by the clamping assembly 810. The hydraulic cylinder 860 includes a work piece adaptor 850 for accepting a first workpiece 820, and a rotational adaptor for accepting rotational force from the rotational actuator means 890. Bearings 880, 882, 884 are included in order to maintain positional alignment of the hydraulic cylinder 860 as linear and rotational forces are applied to force the first workpiece 820 into a second workpiece held in a clamp assembly 810. The axial force provided by the axial force linear actuator assembly 830 and associated energy storing accumulator 870 may be pre-set or energized to a pre-determined force at an off site location and brought to a forge welding site for installation into a friction forge welder without additional energizing by an operator or installer. This enables the elimination of this step from the procedures required by an operator or installer, improving quality control of the forge welding process. Pre-loading the linear actuator assembly 830 may be accomplished by an suitable hydraulic pressure means. By loading the energy storing accumulator 870 to a pre-determined pressure, a pre-determined amount of force or energy is generated and held constant by the linear actuator assembly. The linear actuator assembly 830 and energy storage accumulator 870 enables the first workpiece 820 to travel within the linear actuator assembly 830 until contact is made with the first workpiece 820 and a second workpiece positionally fixed by the clamping assembly 810. The linear and rotational forces are applied by the linear actuator assembly 830, the energy storing accumulator 870 and the rotational actuator means 890 to the first workpiece 820 against a second workpiece for a pre-determined period of time, typically between 3 and 20 seconds, to achieve a satisfactory friction forge weld between the first and second workpieces. The rotational force provided by the rotational actuator means 890 is then stopped while the linear force provided by the stored energy accumulator 870 and linear actuator assembly 830 is maintained for a cool-down period or stress relieving phase, typically between 30 and 60 seconds. The portable friction forge welder 800 is then removed from the second workpiece.

Figure 9:
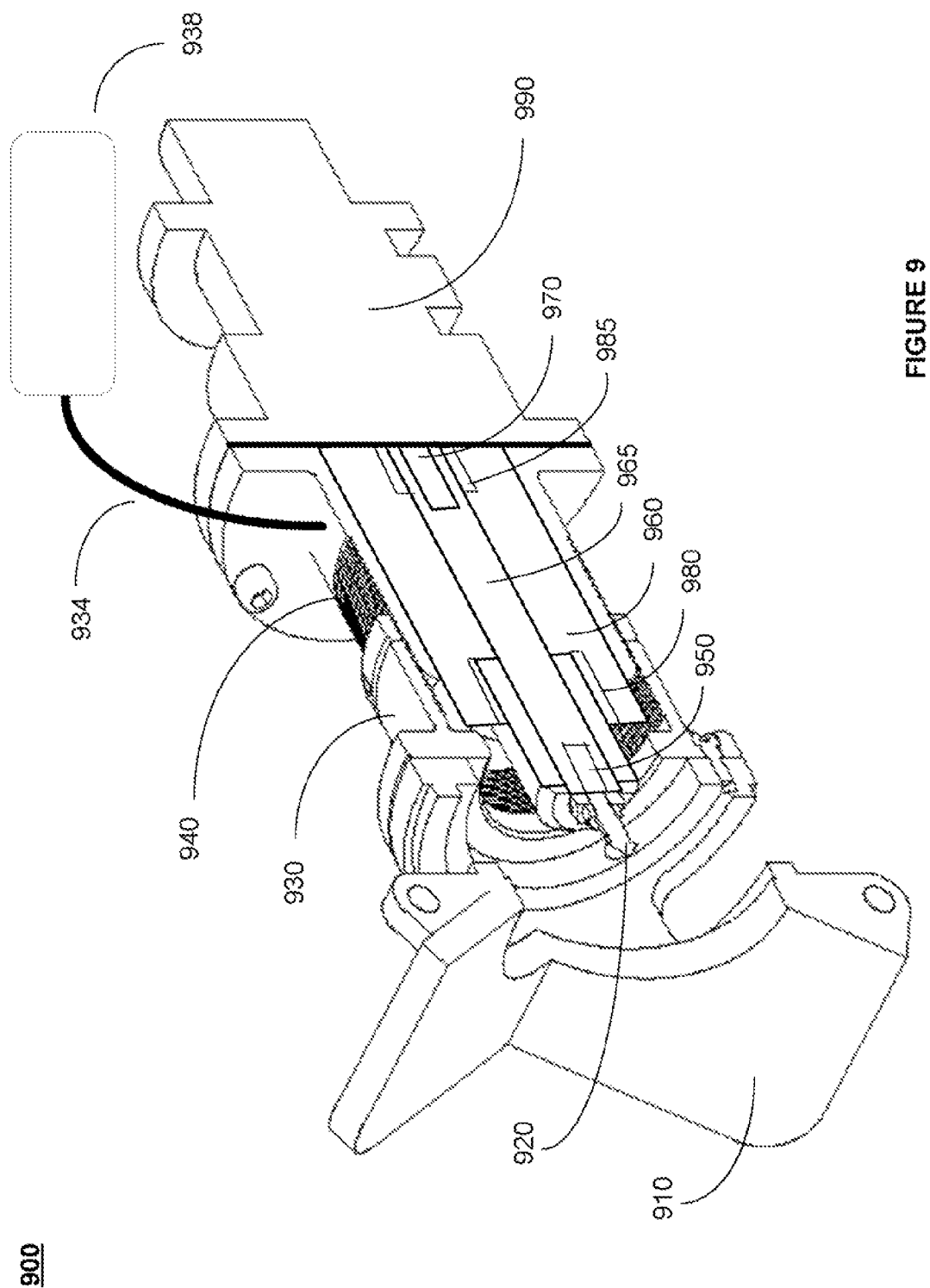
FIG. 9 shows an embodiment of a portable friction forge welder that uses a portable center-hole hydraulic cylinder.

Turning to FIG. 9, FIG. 9 shows an embodiment of a portable friction forge welder 900 that uses a "center-hole" hydraulic cylinder 960 with variable regulated axial force potential of up to 100 tons to provide energy to an axial force linear actuator assembly 930. The embodiment of the portable friction forge welder 900 comprises a clamping means 910, linear actuator assembly 930 connected to a source of regulated hydraulic pressure 938 via a hydraulic hose connection 934, and a rotational actuator means 990. The linear actuator assembly 930 comprises a center-hole hydraulic cylinder 960 containing a center-hole piston 965 actuated by the regulated hydraulic energy source 938, and first workpiece 920 positioned within the hydraulic cylinder 960 and forced against a second workpiece by the clamping assembly 910. The hydraulic cylinder 960 includes a work piece adaptor 950 for accepting a first workpiece 920, and a rotational adaptor 970 for accepting rotational force from the rotational actuator means 990. Bearings 980, 985 are included in order to maintain positional alignment of the hydraulic cylinder 960 as linear and rotational forces are applied to force the first workpiece 920 into a second workpiece held in a clamp assembly 910. Threaded means 940 are provided for securing the hydraulic cylinder 960 within the linear actuator assembly 930, and for advancing the hydraulic cylinder 960 within the linear actuator assemble 930 to maintain contact between a first and second workpiece. Maintaining a linear axial force during a forging phase of the friction forge welding process is accomplished by a regulated constant hydraulic flow from a regulated hydraulic energy source 938, which may be powered by means such as a pneumatic, manual or electric actuation. Other linear force actuating components, such as springs and Bellville washers, may also be included in the linear actuator assembly 930 to augment the hydraulic cylinder 960. A pre-determined regulated axial linear force is applied to the workpiece 920 using a center-hole hydraulic cylinder 960. The center-hole hydraulic cylinder 960 receives regulated hydraulic fluid from a hydraulic energy source 938 as the center-hole piston 965 extends during the plasticizing phase of the forging process. With a predetermined axial force on the first workpiece 920 and the rotational actuator means 990 connected via the rotational adaptor 970 to the center-hole hydraulic cylinder 960, the linear and rotational forces are applied by the linear actuator assembly 930 and the rotational actuator means 990 to the first workpiece 920 against a second workpiece for a pre-determined period of time, typically between 3 and 20 seconds, to achieve a satisfactory friction forge weld between the first and second workpieces. The rotational force provided by the rotational actuator means 990 is then stopped while the linear force provided by the center-hole hydraulic cylinder 969 is maintained for a cool-down period or stress relieving phase, typically between 30 and 60 seconds. The portable friction forge welder 900 is then removed from the second workpiece.

Figure 10:
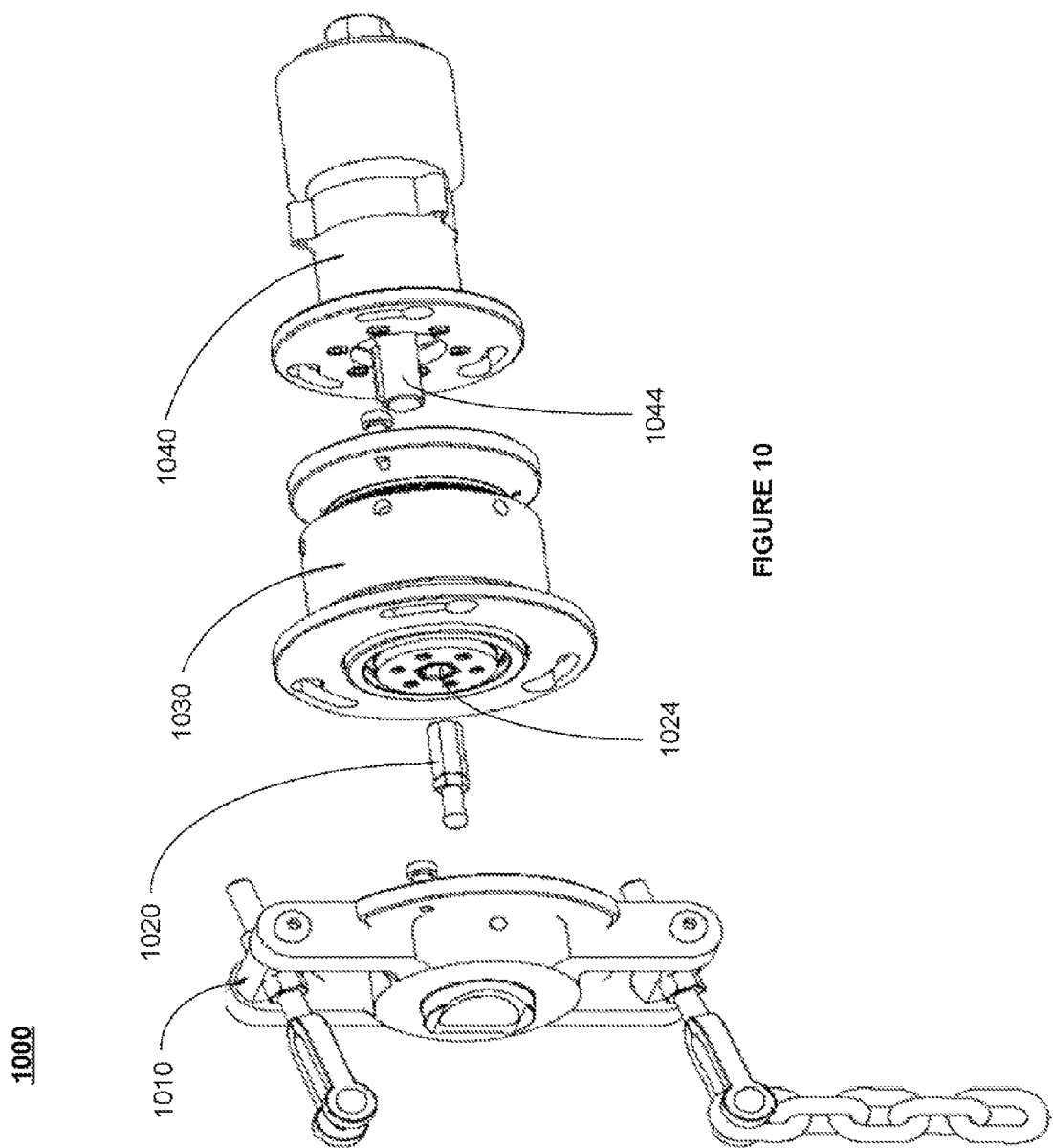
FIG. 10 shows an alternative embodiment of a portable friction forge welder that uses preloaded compressed gas to proves the linear actuator, similar to FIG. 6.

Turning to FIG. 10, FIG. 10 shows an alternative embodiment 1000 of a portable friction forge welder that uses pre-loaded compressed gas to store or pre-charge a linear actuator 1030 for providing an axial force in a portable friction forge welding operation, similar to FIG. 6. FIG. 10 includes another embodiment of a clamping assembly 1010. The portable friction forge welder 1000 comprises three main sections, including a clamping means 1010, a linear actuator assembly 1030 and a rotational actuator means 1040. The linear actuator assembly 1030 comprises a stored energy linear actuator and first workpiece 1020 for being positioned within a workpiece adaptor 1024 in the linear actuator assembly 1030 and forced against a second workpiece by the clamping assembly 1010. The linear actuator assembly 1030 includes the workpiece adaptor 1024 for accepting a first workpiece 1020, and a rotational adaptor (not shown) for accepting mating rotational adaptor 1044 from the rotational actuator means 1040. Bearings are included in order to maintain positional alignment of the linear actuator assembly 1030 as linear and rotational forces are applied to force the first workpiece 1020 into a second workpiece (not shown) held in the clamp assembly 1010. Unlike many fluids that are not compressible, a compressed gas may be used as an energy storage medium. A compression action between the first workpiece 1020 and the second workpiece to achieve a desired linear force is accomplished through use of the clamping assembly 1010. The linear and rotational forces are applied by the linear actuator assembly 1030 and the rotational actuator 1040 to the first workpiece 1020 against a second workpiece for a pre-determined forgeable time period, typically between 3 and 20 seconds, to achieve a satisfactory friction forge weld between the first and second workpieces. The rotational force provided by the rotational actuator 1040 is then stopped while the linear force provided by the stored energy linear actuator assembly 1030 is maintained for a cool-down period or stress relieving phase, typically between 30 and 60 seconds. The portable friction forge welder 1000 is then removed from the second workpiece.

While the invention has been described with references to its preferred embodiment, it will be understood by those skilled in the art that various changes may be made and equivalents may be substituted for elements thereof without departing from the true spirit and scope of the invention. In addition, many modifications may be made to adapt a particular situation or material to be teaching of the invention without departing from its essential teachings.

The invention claimed is:

1. A method for welding a first workpiece to a second workpiece using a portable friction forge welder, comprising the steps of:
    forcibly positioning the first workpiece against the second workpiece by applying a predetermined axial force to the first workpiece by a pre-energized, stored energy linear actuator prior to a rotating step;
    starting a timer and a rotating step to begin a predetermined forgeable time period after the positioning step;
    rotating the first workpiece at a predetermined angular velocity for the predetermined forgeable time period to ensure a satisfactory friction forge weld at an interface between the first workpiece and the second workpiece, the forgeable time period beginning after the predetermined axial force is applied in the positioning step; and
    stopping the timer and the rotating step at the end of the forgeable time period and maintaining the predetermined axial force until the interface between the first workpiece and the second workpiece has cooled to form a friction weld.

2. The method of claim 1, further comprising the step of pre-loading the stored energy linear actuator by forcibly positionally fixing the first workpiece in contact with the second workpiece by a clamping means.

3. The method of claim 2, further comprising the steps of encapsulating and sealing the interface between the first workpiece and the second workpiece from the ambient atmosphere by a shroud positioned on the clamping means.

4. The method of claim 3, further comprising the step of positively pressurizing the shroud with an inert atmosphere.

5. The method of claim 1, wherein the pre-energized, stored energy linear actuator is selected from the group consisting of a hydraulic cylinder, a hydraulic cylinder and energy storage accumulator, a compressed gas cylinder, compressed springs, spring washers and Bellville washers.

6. The method of claim 2, further comprising the step of preloading the linear actuator prior to rotating for accurately locating and securing the workpieces to the clamping means to compensate for residual flexing of the clamping means while under load.

7. The method of claim 1, wherein the rotational actuator is selected from the group consisting of an electric motor, a pneumatic motor, a hydraulic motor and a combustion engine.

8. The method of claim 1, wherein the forgeable time period is determined a priori based on a force applied between the first and second workpieces by the linear actuator, an angular velocity and torque produced by the rotational actuator for rotating the first workpiece against the second workpiece, and a diameter and material characteristics of the workpieces.

9. The method of claim 1, wherein the forgeable time period is set into a timing device for starting and stopping a power source provided to the rotational actuator.

10. A method for portable friction forge welding a first workpiece to a second workpiece, comprising the steps of:

positionally fixing the first workpiece in contact with the second workpiece by a clamping means;

preloading the clamping means by forcibly positioning the first workpiece against the second workpiece by applying a predetermined constant axial force to the first workpiece by a pre-energized, stored energy linear actuator;

eliminating affects of mechanical flexing of the clamping means by positionally fixing an accurate positional relationship between the first workpiece and the second workpiece while the predetermined constant axial force is applied to the first workpiece;

starting a timer and a rotating step to begin a predetermined forgeable time period after the positioning step;

rotating the first workpiece by a rotational actuator at a predetermined angular velocity for a predetermined forgeable time period to ensure a satisfactory friction forge weld at an interface between the first workpiece and the second workpiece, the forgeable time period beginning after the predetermined axial force is applied in the preloading step;

stopping the timer and the rotating step at the end of the forgeable time period; and maintaining the predetermined axial force until the interface between the first workpiece and the second workpiece has cooled to form a friction forge weld.

11. The method of claim 10, wherein the forgeable time period is determined a priori based on a force applied between the first and second workpieces by the linear actuator, an angular velocity and torque produced by the rotational actuator for rotating the first workpiece against the second workpiece, and a diameter and material characteristics of the workpieces.

12. The method of claim 10, wherein the forgeable time period is set into a timing device for starting and stopping a power source provided to the rotational actuator.

* * * * *